Feb. 6, 1945. R. E. CUMMINGS 2,369,025
VALVE INSERT SEAT
Filed Aug. 30, 1943

Inventor
ROBERT E. CUMMINGS
by
Attys.

Patented Feb. 6, 1945

2,369,025

UNITED STATES PATENT OFFICE 2,369,025

VALVE INSERT SEAT

Robert E. Cummings, Cleveland, Ohio, assignor to Thompson Products, Inc., a corporation of Ohio Application August 30, 1943, Serial No. 500,594

10 Claims. (Cl. 123—188)

My invention relates to valve inserts and particularly to seat inserts for the exhaust poppet valves in internal combustion engines.

A large amount of valve trouble is due to irregular seating of the exhaust valve caused by thermal distortion of the valve seat in the block or cylinder, this being particularly troublesome in air cooled aircraft engines because of the tremendous amount of heat generated in each individual cylinder. The exhaust gas passing out through the exhaust port at one point in the cylinder head results in unequal heating of the head, particularly where the head is metal such as aluminum. This unequal heating produces unequal thermal expansion of the head portion surrounding the valve seat and this in turn tends to change the seating surface of the valve seat insert from its original round shape to some other shape, sometimes oval. Another effect of this unequal heating may be the tilting of the valve seat insert relative to the exhaust valve guide, since the valve is dependent on the valve guide for its alignment and it therefore cannot follow these changes in the valve seat insert, the result being leakage past the exhaust valve when it should be tightly closed.

As the valve insert seat is in the path of the hot exhaust flame and gases, insert seats have been made of heat and corrosion resistant material, as for example, stainless steel. However, such metal has a very low coefficient of thermal conductivity and becomes excessively heated unless provision is made for quick conduction of the heat away from the insert to the surrounding cylinder head metal for dissipation An important object of my invention is to produce an improved valve insert which is corrosion resistant and which has means associated therewith and forming part thereof for rapidly conducting heat away from its seating surface to the surrounding cylinder head metal.

Another object of the invention is to produce a valve seat insert of composite formation embodying corrosive resistant metal and metal of high heat conductivity, with the metals so arranged that they together provide the valve seating surface, but with the high conductivity metal extending from the seating surface to rapidly conduct heat away therefrom to the surrounding head metal.

Another object is to produce a composite metal valve seat insert in which the arrangement of the metals around the valve seat surface is such that when distortion occurs, there will be sufficient flexibility to permit the seating impact of the valve to force the insert back to its proper shape for accurate and intimate seating of the valve. A further object is to construct the valve seat insert of metal, such as stainless steel, which has the necessary strength requirements and is corrosion resistant, with other metal of high heat conductivity, such as silver, arranged in concentric layers or laminations alternating with layers of steel, and with all the layers terminating in the valve seating surface and extending therefrom and with the highly conductive metal layers serving to conduct heat away from the seat surface and from the steel layers to the cylinder head metal surrounding the insert.

My improved structure and its advantages will be fully understood from the drawing, in which:

Figure 1 is a longitudinal diametral section of a portion of a cylinder head with a valve seat insert embodying my invention applied and with a poppet valve seating on the insert;

Figure 2 is a plan view of the insert shown on Figure 1;

Figure 3 is a section of a portion of a cylinder head and a modified form of insert seat; and Figures 4 and 5 show other modified insert seat structures.

Referring to Figure 1, 10 indicates a cylinder head or block having the port passageway 11 therethrough surrounded at its mouth by a recess 12 of rectangular cross section. The seat insert shown on Figures 1 and 2 comprises the annular body 13 of metal which satisfies the necessary strength requirements and which is corrosion resistant, as for example stainless steel. This seat member provides the bevelled seat surface 14 for a poppet valve 15. The body 13 has a number of concentric pockets or grooves formed therein extending down from the top and terminating close to the bottom of the insert body and these grooves are filled with silver or other soft and comparatively plastic metal having high heat conducting characteristics and also corrosion resistant. This comparatively soft metal could be applied in fused condition in the grooves, or the metal could be in the form of rings inserted in the grooves and brazed or welded intimately to the metal of the insert body 13. The alternate annular layers or laminations of steel and the softer metal terminate in the valve seating surface 14 and in the top surface of the insert surrounding the seating surface, the layers of the softer metal extending down to near the bottom of the insert body 13 in the structure shown on Figure 1. The upper ends of the layers of the high conductivity layers are thus exposed to the hot exhaust gases and absorb a considerable part of this heat to conduct it toward the metal of the cylinder block for dissipation. The annular layers of the metal of the seat body 13 being comparatively thin, and the heat conductive metal in the grooves thereof being relatively soft and plastic, these thin layers of the body metal may be formed back into proper shape by the impact of the valve for accurate seating of the valve, after any distortion or deformity of the insert such as might result from unequal heating of the cylinder block portion surrounding the insert. If such unequal displacement of the cylinder head metal resulted in change of the seating surface of the valve seat from its original round shape to some other shape, as for example oval, then the laminations of the insert may respond to the force of the valve impact to be restored to proper shape and for restoration of the valve seating surface for accurate seating thereagainst by the valve.

The modified arrangement shown on Figure 3 is similar to the arrangement in Figure 1 except that a greater number of annular grooves 18 are provided and these grooves do not extend down as deeply as in the arrangement of Figure 1. The grooves all terminate at their outer ends in the seating surface 19 and the top surface of the insert body 13 surrounding the seating surface, and the grooves are filled with comparatively soft metal of high thermal conductivity, such as silver. A laminated zone of alternate layers of the metal of the body 13 and interposed silver thus surrounds the seating surface 19 in which all the layers terminate and heat is rapidly conducted away to be dissipated by the metal surrounding the insert. As the body metal layers are thin and the interposed metal is comparatively soft, any distortion of the seating zone from unequal temperature conditions will be rectified by the valve engagement and impact so that the valve may maintain the correct seating surface for intimate uniform valve seating and the elimination of leakage.

In the modified arrangement shown on Figure 4, the seat insert is built up of alternate annular layers or rings 21 of comparatively strong metal, such as stainless steel, and layers or rings 22 of softer corrosion resistant metal of high thermal conductivity, such as silver. These layers may be intimately brazed or welded together, the layers at their outer ends forming the laminated valve seating surface 23 and at their inner ends engaging the bottom of the recess 12 into which the insert is fitted. The layers of the heat conductive material will conduct heat away from the layers of steel whose coefficient of thermal conductivity may be rather low, the heat being transferred to the metal of the surrounding cylinder block 10 for dissipation.

In the modified arrangement shown on Figure 5, a plurality of layers or rings 25 of L-shape cross section are nested together concentrically with their bases in abutment, this assembly surrounding a comparatively heavy inner ring 26 and being surrounded by an outer ring 27. The rings 25, 26 and 27 are of material such as stainless steel and the filler 28 in the spaces between the laminations is silver or other corrosion resistant material of high thermal conductivity. The laminations and filler are intimately secured together as by brazing or welding, and the steel and filler layers all terminate at their outer ends in the bevelled valve seating surface 29 and the surface surrounding the seating surface. The high conductivity layers will conduct the heat away from the seating surface and from the steel layers to the surrounding metal of the cylinder block 10 for dissipation. To increase the heat transfer, the steel layers between the outer and inner rings 26 and 27 may have radially aligned openings therethrough which will be filled with the heat conductive material to form a connection 30 between the layers of this material. Heat will be conducted axially and radially away from the steel lamination to the engine block 10. With the comparatively thin steel laminations and the interposed softer heat conducting material, the insert zone surrounding the seating surface will be sufficiently yieldable so that distortions thereof due to uneven heating of the cylinder head may be corrected by the force of the valve seating so that the valve may maintain the seating surface in true for accurate engagement by the valve.

In the arrangement of Figures 1 and 2, I have shown the seat body 13 provided at its inner side with a depending flange 31 for engagement in the counterbore or recess 32, and in the arrangement of Figure 4 the inner ring 21 is extended downwardly for engagement in the counterbore 32. For some installations, these rings may be of advantage in supporting the seat insert, but in other installations such extension may be omitted, as shown for example on Figure 5.

I have shown practical and efficient embodiments of the features of my invention but I do not desire to be limited to the exact constructions and arrangements shown as changes and modifications may be made without departing from the scope of the invention.

I claim as follows:

1. A valve seat insert comprising an annular body of comparatively hard corrosion resistant metal and having a valve seating surface, and concentric annular layers of comparatively soft heat conductive metal embedded therein and exposed at their outer ends at said seating surface for transfer of heat from the insert to a support in which the insert is applied.

2. A valve seat insert comprising an annular body of comparatively hard non-corrosive metal and having a valve seat surface thereon, a plurality of annular grooves in said body extending thereinto from said seat surface, and comparatively soft metal of high heat conductivity filling said grooves for exposure at said seat surface for transferring heat from said surface and said body to the support on which the insert is applied.

3. A valve seat insert comprising an assembly of concentric annular layers secured together, said layers being alternately of comparatively hard non-corrosive metal and comparatively soft non-corrosive metal of high heat conductivity, said assembly providing a valve seat surface and said layers being exposed at said surface for conduction of heat by the high conductivity metal away from said surface.

4. A valve seat insert composed of corrosion resistant metal and high heat conductivity metal in layered relation with the edges of the layers forming the seating face of the insert.

5. A valve seat insert composed of stainless steel and silver in layered relation and with both the steel and silver exposed at the seating face of the insert.

6. A valve seat insert comprising a body of comparatively hard metal presenting an annular seating surface, said body having a radially extending row of annular grooves therein extending from said seat surface and leaving the row of thin walls of the body metal between the grooves, said grooves being filled with comparatively soft and yieldable metal of high heat conductivity exposed at the seat surface to conduct heat away from said surface, the zone of said alternate layers of body metal and softer metal surrounding said seat surface being sufficiently flexible to be forced by valve impact back into true shape when distorted whereby the seat surface will be maintained true.

7. A valve seat insert composed of a plurality of internested layers of corrosion resistant metal and high heat conductivity metal with the outer edges of the layers combining to form the seating face of the insert.

8. A valve seat insert composed of a plurality of annular internested layers of metal with their outer edges combining to form the seating face of the insert.

9. A valve seat insert composed of a plurality of annular internested layers of metal with their outer edges combining to form the seating face of the insert, the metal of the layers being sufficiently pliable so that the edge portions thereof will be forced by valve impact back into true shape when distorted, whereby the seat face will be maintained true.

10. A composite metal valve seat insert having a beveled seat face, the zone surrounding the seat face being composed of layers alternately of corrosion resistant metal and high heat conductivity metal, said layers being so arranged that their outer edges combine to form a continuous surface defining the seat face.

ROBERT E. CUMMINGS.